June 3, 1958  J. E. GUTRIDGE  2,837,226
DEVICE FOR LOADING TRAILERS ON FLAT CARS
Filed Sept. 17, 1953  4 Sheets-Sheet 1
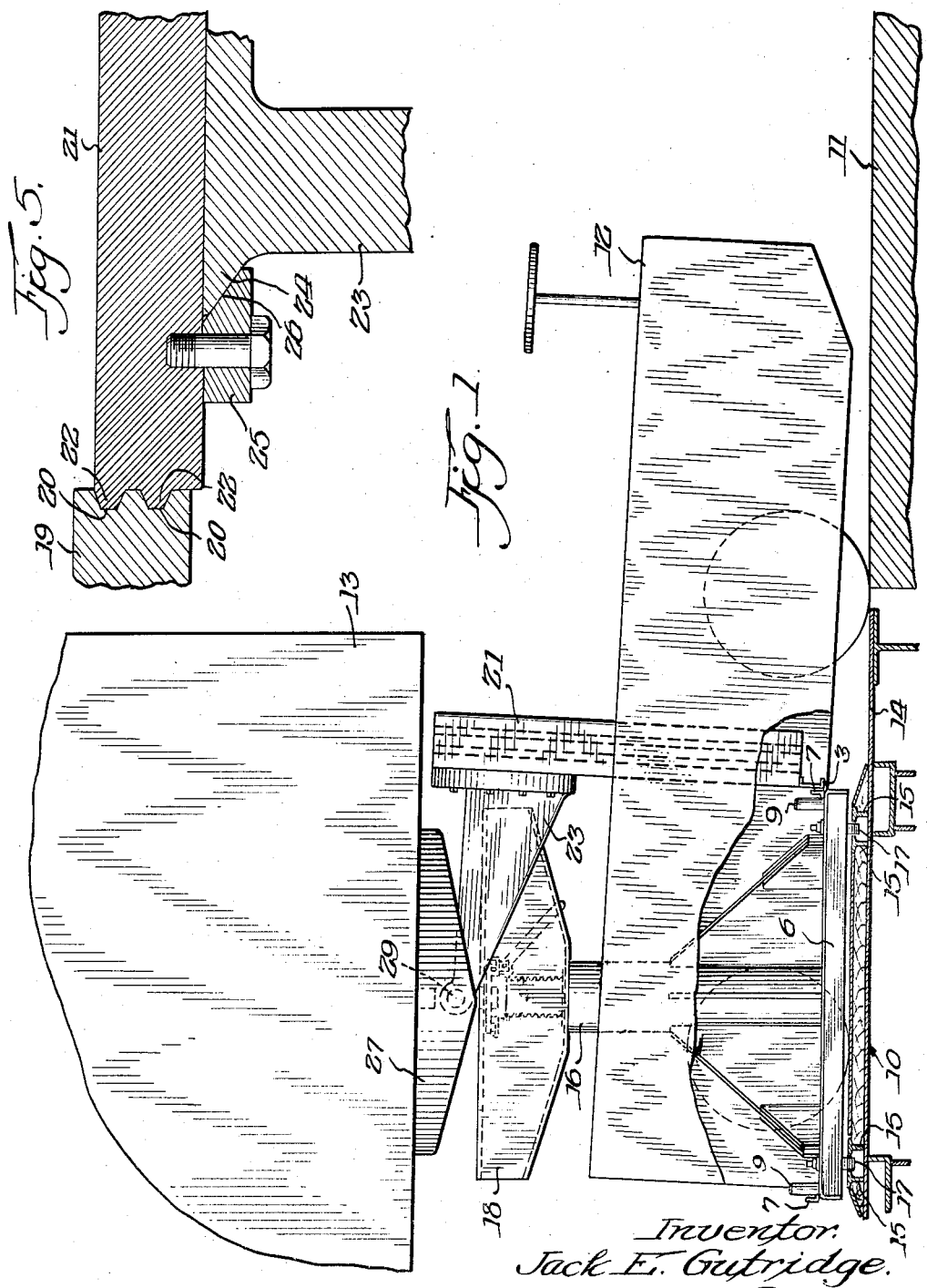
Inventor:
Jack E. Gutridge.
By Wayne Morris Russell
Atty.

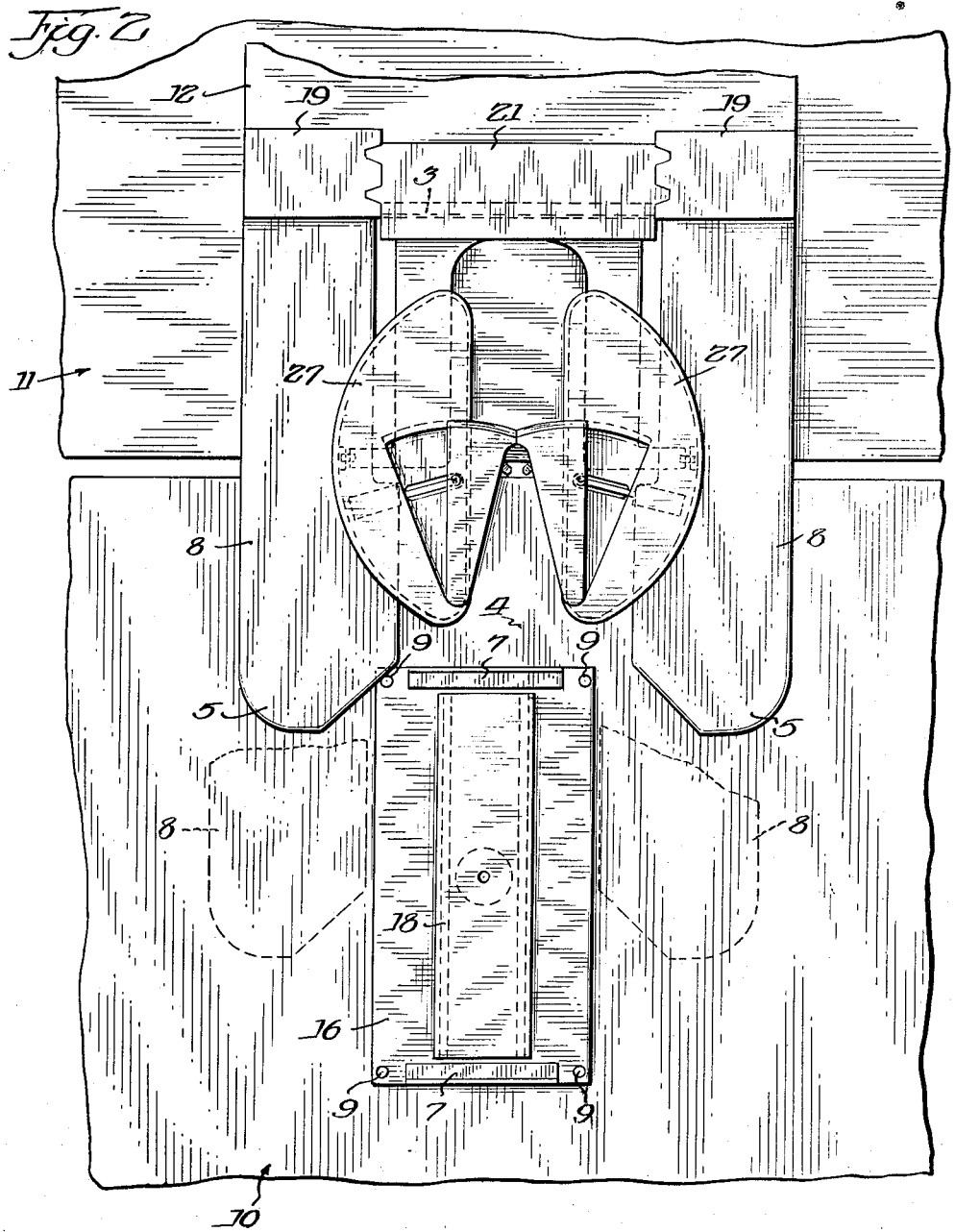

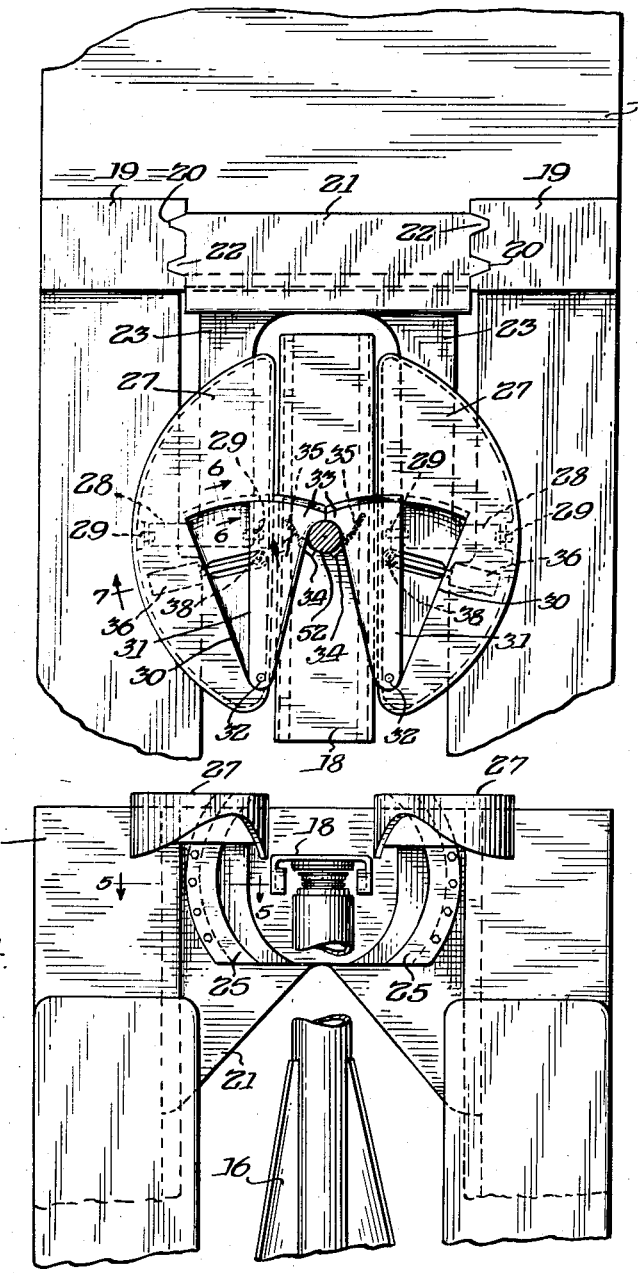

June 3, 1958     J. E. GUTRIDGE     2,837,226
DEVICE FOR LOADING TRAILERS ON FLAT CARS
Filed Sept. 17, 1953     4 Sheets-Sheet 4
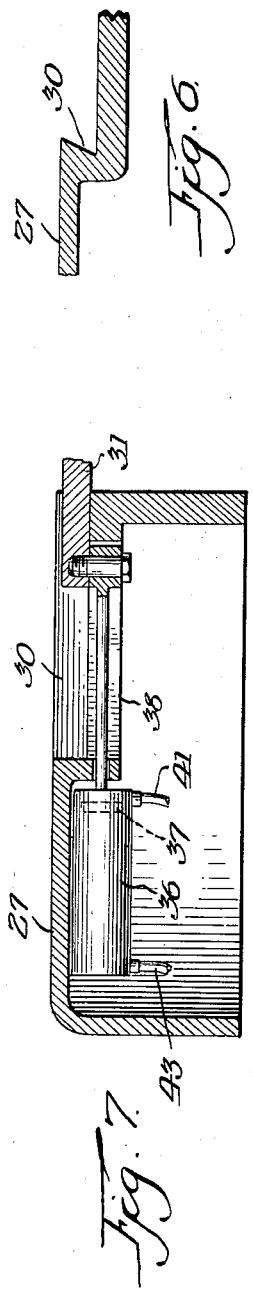
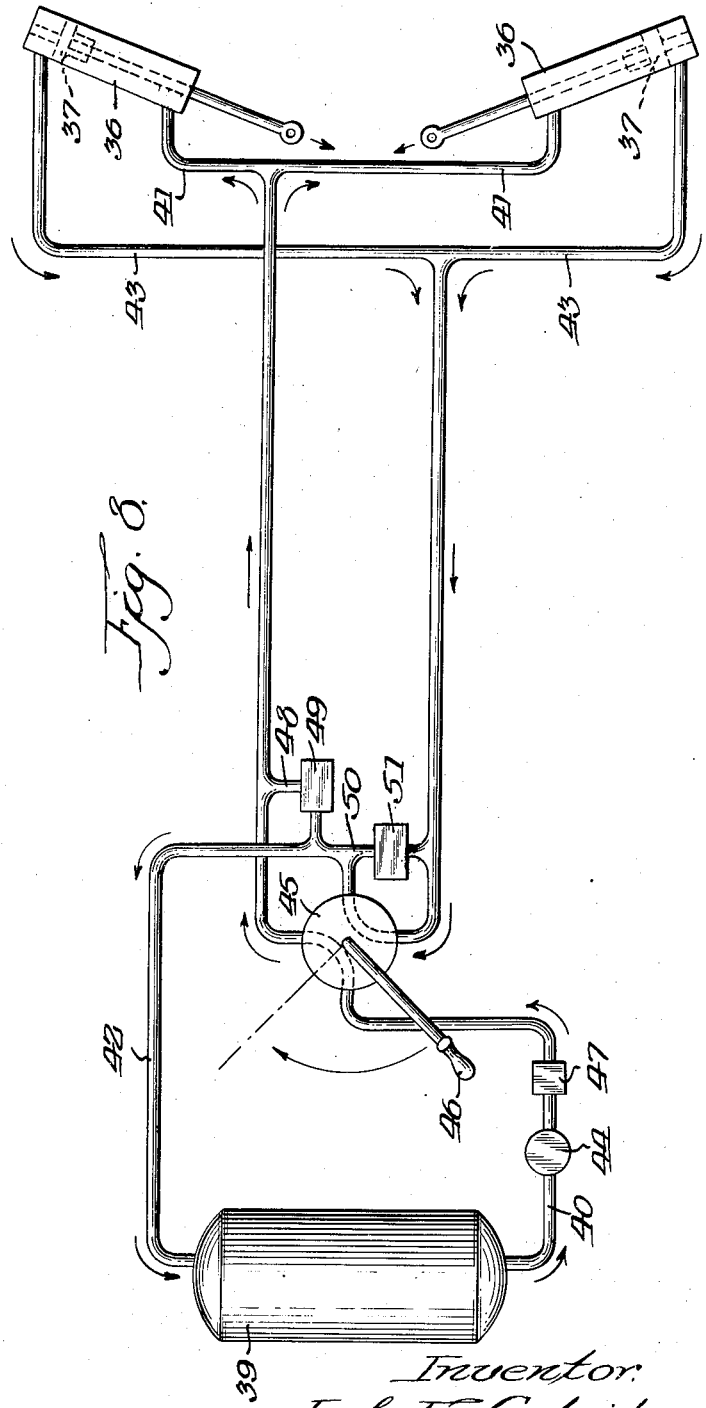

United States Patent Office 2,837,226
Patented June 3, 1958

2,837,226

DEVICE FOR LOADING TRAILERS ON FLAT CARS

Jack E. Gutridge, Munster, Ind., assignor to Pullman-Standard Car Manufacturing Company, Chicago, Ill., a corporation of Delaware Application September 17, 1953, Serial No. 380,766

2 Claims. (Cl. 214—38)

This invention relates to lift trucks and is primarily concerned with a lift truck mechanism for loading highway vehicles on railway freight vehicles.

The principal object of the invention is to provide a mechanism for a lift truck for loading vehicles on freight vehicles.

Another object of the invention is to provide a lift truck mechanism adapted to support the bottom of a vehicle to be loaded on a freight vehicle having its central area open so that a member on a stand on the freight vehicle can project through the open area when the mechanism is lowered in the area of the member to deposit the vehicle on the member.

Another object of the invention is to provide a lift truck mechanism including means for guiding the mechanism around the fifth wheel pin of a truck trailer and enclosing the mechanism about the pin.

An important object of the invention is to provide a mechanism for a lift truck for handling a vehicle which is so mounted on the lift truck as to maintain a plate of the mechanism which bears against the bottom of the vehicle in a plane parallel to a plane through the bottom of the vehicle during all movements of the lift truck with respect to the vehicle.

A further object of the invention is to provide a lift truck for loading trailers on freight vehicles having an opening in its front end adapted to receive the fifth wheel stand on the freight vehicle and the walls of the opening engaging the stand so as to position the fifth wheel pin on the trailer directly over an opening in the top of the stand.

A further object of the invention is to provide a novel method of loading a vehicle on a freight vehicle.

A more specific object of the invention is to provide a lift truck mechanism for loading truck trailers on freight vehicles including a pair of spaced arms mounted on the lift truck and a pair of spaced plates pivotally mounted on the arms and a pair of elements pivotally mounted on the plates and manually operable means on the lift truck for moving the elements into contact and the plates being adapted to support the bottom of the trailer and the elements being adapted to guide the mechanism around the trailer fifth wheel pin and to enclose the pin.

The foregoing and other objects of the invention are attained by the construction and arrangement illustrated in the accompanying drawings wherein—

Fig. 1 is an elevational view showing a lift truck depositing the front end of a truck trailer on a fifth wheel stand on a railway flat car;

Fig. 2 is a top plan view of the railway flat car and the lift truck and the platform and showing the lift truck about to be guided around the fifth wheel stand on the flat car in solid lines and showing the lift truck after it has been guided around the stand in dotted lines;

Fig. 3 is a top plan view of the lift truck mechanism for lifting the front end of the trailer and the horizontally disposed member on the top of the fifth wheel stand with the trailer fifth wheel pin positioned in an opening in the member and the mechanism enclosing the pin;

Fig. 4 is an elevational view of the lift truck mechanism and the fifth wheel stand showing the member on the stand positioned between plates of the mechanism;

Fig. 5 is a cross sectional view taken on the line 5—5 of Fig. 4;

Fig. 6 is a cross sectional view taken on the line 6—6 of Fig. 3;

Fig. 7 is a cross sectional view taken on the line 7—7 of Fig. 3; and

Fig. 8 is a diagrammatic view of the hydraulic system mounted on the lift truck for actuating the mechanism on the lift truck which encloses the trailer fifth wheel pin.

The invention proposes a lift truck mechanism for loading truck trailers on railway flat cars. The lift truck mechanism is comprised of a pair of horizontally disposed spaced arms and a pair of generally horizontally disposed spaced plates are pivotally mounted intermediate their ends on the arms. A horizontally disposed element is provided for each plate and the element has one end pivotally connected to the respective plate. A hydraulic system is mounted on the lift truck and is operatively connected to the elements and is operated by the lift truck operator whereby the elements may be moved toward or away from each other. The lift truck operator moves the elements toward each other and into contact and the elements together form a guideway. The lift truck is then moved under the trailer and the elements are guided around the fifth wheel pin on the trailer. The lift truck then moves the trailer onto the flat car so that the plates are positioned over a horizontally disposed member mounted on top of a fifth wheel stand which is mounted on the floor of the flat car. The lift truck operator then lowers the plates so that the member comes between the plates and the fifth wheel pin enters an opening in the member and the bottom of the trailer rests on the member. The lift truck is then moved off the flat car.

In the drawings, 10 generally designates a freight vehicle or railway flat car parked alongside a platform 11 at a railroad terminal. A lift truck 12 is used to load a vehicle or truck trailer 13 on the flat car 10. The trailers 13 are hauled to the railroad terminal by truck tractors and are left on the platform 11 ready to be loaded on the flat car 10. The trailer 13 has eight rear wheels adjacent its rear end and it has dolly wheels adjacent its front end and the dolly wheels support the front end of the trailer while it is parked on the platform 11. The eight rear wheels on the trailer 13 are arranged so that a first pair of wheels are disposed in front of a second pair of wheels at one side of the trailer and a third pair of wheels are disposed in front of a fourth pair of wheels at the other side of the trailer. The flat car 10 has a metal floor 14 disposed flush with the platform 11. Pairs of spaced T-shaped rails 15 extend longitudinally of the flat car 10 and are positioned on the floor 14 and are secured to the floor. A wood filler is disposed between the two pairs of rails 15 and a metal plate is disposed on the wood filler and is secured to the flanges of the adjacent rails. A metal ramp plate extends from the outermost rail of each pair of rails 15 to the floor 14 and is secured to the flange of the rail and the floor.

A vertically disposed fifth wheel stand 16 has pairs of wheels arranged one in front of the other and each wheel is made up of a roller and a rib 17 extending around the roller intermediate the ends of the roller. The roller on each wheel is adapted to roll upon the adjacent pair of rails 15 and the rib 17 on each wheel is adapted to project between the adjacent pair of rails. One pair of wheels on the stand 16 are adapted to roll on one pair of rails 15 and the other pair of wheels are adapted to roll on the other rails 15. Thus the stand 16 is movable longitudinally of the flat car 10 on the rails 15. The fifth wheel stand 16 has a rectangular-shaped portion 6 and a pin 9 is positioned at each corner of the portion 6 and is fixedly secured to the stand. A pair of angles 7 are positioned on top of the portion 6 along the sides thereof and the angles are fixedly secured to the portion 6. A horizontally disposed member in the form of an inverted channel 18 is mounted upon the top of the stand 16 and is fixedly secured to the stand.

The lift truck 12 has a pair of front wheels which rotate about fixed axes and these wheels lie in planes extending longitudinally of the lift truck and are adapted for forward or backward movement of the lift truck. The lift truck 12 has another pair of front wheels which lie in a plane extending transversely of the lift truck and these wheels are retractible into the lift truck and are adapted to assist in the moving of the lift truck transversely of itself. The lift truck 12 has one rear wheel and this wheel is movable about a vertical axis through an angle of 180 degrees so that it can be directed longitudinally of the lift truck or transversely of the lift truck. The lift truck 12 is driven by a motor which is operatively connected to the rear wheel. When forward or backward movement of the lift truck 12 is desired the rear wheel is moved until it is in a plane extending longitudinally of the lift truck. The lift truck 12 can then be moved forward or backward on the first named pair of front wheels and the rear wheel. To move the lift truck 12 transversely of itself the retractible pair of front wheels are lowered to raise the first named pair of front wheels off the supporting surface and the rear wheel is moved until it is in a plane extending transversely of the lift truck. The lift truck 12 can then be moved transversely of itself on the retractible pair of front wheels and the rear wheel. The lift truck 12 has an opening 4 midway of its front end between the shoulders 8 and this opening extends inwardly of the lift truck and terminates in the area of pair of spaced standards 19 having guideways 20 in their confronting faces. A wedge-shaped structure 5 is formed on the end of each shoulder 8 of the lift truck 12 and a horizontally disposed channel 3 is positioned below the standards 19 and extends across the opening 4 and is welded to the lift truck and the flanges of the channel project toward the rear end of the lift truck while the web of the channel is in vertical alignment with the end wall of the notch. An elevator 21 is slidably mounted between the standards 19 for upward or downward movement. More specifically, the elevator 21 has a plurality of ribs 22 projecting into the guideways 20 in the standards 19 and the elevator is operatively connected to the drive motor above mentioned so that vertical movement of the elevator is provided for.

A structure is mounted on the exposed vertical face of the elevator 21 and includes a pair of spaced horizontally disposed arms 23. The structure has two opposed curved projecting edges 24 in the shape of an arc of a circle. A pair of spaced guides 25, each having the shape of a segment of a circle (see Fig. 4), are secured by a plurality of spaced screws to the elevator 21 as best shown in Figs. 4 and 5. One corner of each guide 25 is cut away as at 26 (see Fig. 5) so as to provide a space between the respective guide and the elevator 21. The curved edges 24 of the structure are adapted to project into the space between the respective guide 25 and the elevator 21. Thus the structure is mounted in the guides 25 for oscillatory or pivotal movement about a horizontal axis. A generally horizontally disposed plate 27 is pivotally mounted on one of the arms 23 and another generally horizontally disposed plate 27 is spaced from the first named plate and pivotally mounted on the other of the arms 23. Each arm 23 has an extension 28 extending at right angles to the arm and integral with the free end of the arm. Each plate 27 is pivotally connected intermediate its ends to the free end of the adjacent arm 23. More specifically, each plate 27 is flanged and a pin 29 projects into the extension 28 on the respective arm 23 and into a boss on the flange and another pin 29 projects into the arm and into another boss on the flange to mount the plate on the arm for pivotal movement about a horizontal axis as best shown in Fig. 3. It is to be noted that the plates 27 pivotally move about horizontal axes which are at right angles to the horizontal axis about which the structure moves. The plates 27 each have a recess 30 in their upper faces and the recesses begin at the confronting edges of the plates as best shown in Figs. 3 and 6. A horizontally disposed generally triangular-shaped element 31 is positioned in each recess 30 and the element has one end pivotally connected to the adjacent plate 27 by a pivot pin 32 extending through the element and into the plate. When each element 31 is seated in the recess 30 in its respective plate 27 the upper surface of the element is spaced slightly below the upper surface of the plate. Each element 31 has an integral projection 33 at its other end. Each element 31 also has a pin 34 slidably mounted therein and a coil spring 35 is disposed in the element and urges the pin outwardly of the element. A cylinder 36 is secured to the lower face of each plate 27 as shown in Fig. 7 and a piston 37 is positioned in each cylinder and each piston has a piston rod which projects through one end of its respective cylinder as best shown in Figs. 7 and 8. The free end of each piston rod is pivotally connected to the adjacent element 31 by a screw which extends through the piston rod and into the element. Each plate 27 has a slot 38 in the bottom of its recess 30 so that the piston rod and its screw can move freely.

A hydraulic system best illustrated in Fig. 8 is mounted on the lift truck and has a reservoir 39 filled with a liquid. A conduit is made up of a main line 40 in communication with one end of the reservoir 39 and a pair of branch lines 41 and one branch line is in communication with one cylinder 36 on one side of its piston 37 and the other branch line is in communication with the other cylinder 36 on one side of its piston. Another conduit is made up of a main line 42 in communication with the other end of the reservoir 39 and a pair of branch lines 43 and one branch line is in communication with one cylinder 36 on the other side of its piston 37 and the other branch line is in communication with the other cylinder 36 on the other side of its piston. A power pump 44 is situated in the main line 40 and a selector valve 45 is situated between the main lines 40 and 42 and the valve has a handle 46. A check valve 47 is situated in the main line 40 between the pump 44 and the valve 45. A line 48 is in communication with the main lines 40 and 42 and a relief valve 49 is located in this line. Another line 50 is in communication with the main line 42 on opposite sides of the valve 45 and a relief valve 51 is located in this line. Movement of the handle 46 to the dotted line position in Fig. 8 will cause the liquid to be pumped through the main line 42 into branch lines 43 and into the cylinders 36 to move the pistons 37 toward each other and the elements 31 toward each other. Movement of the handle 46 to the solid line position in Fig. 8 will cause the liquid to be pumped through the main line 40 into branch lines 41 into the cylinders 36 to move the pistons 37 away from each other and the elements 31 away from each other and liquid will flow from the cylinders 36 into branch lines 43 and into the main line 42 and into the reservoir 39.

Assuming that the trailer 13 is parked on the platform 11 ready to be loaded on the flat car 10, the operator of the lift truck 12 first moves the handle 46 so that the elements 31 are brought together to form a guideway as best illustrated in Fig. 3. The lift truck then approaches the trailer and moves under the front end of the trailer until the plates 27 are below and in front of an object or fifth wheel pin 52 which projects from the bottom of the trailer between the front end and the dolly wheels. The lift truck operator then moves the elevator 21 upwardly until the plates 27 are very close to the bottom of the trailer. The lift truck 12 then moves farther under the trailer 13 so that the elements 31 are guided around the fifth wheel pin 52 on the trailer. Continued movement of the lift truck 12 will cause the fifth wheel pin 52 to force the pins 34 inwardly of the elements 31 against the force of springs 35. As soon as the fifth wheel pin 52 moves past the pins 34 the springs 35 will urge the pins back into the guideway. The projections 33 on the elements 31 and the pins 34 together will prevent the fifth wheel pin 52 from moving from its position between the plates 27. The elevator 21 on the lift truck 12 is then moved upwardly so that the plates 27 come into contact with the bottom of the trailer 13 and lifts the front end of the trailer off the platform 11 so that the dolly wheels no longer support it. When the front end of the trailer 13 is lifted by the lift truck 12 the bottom of the trailer may not be on a horizontal level and the plates 27 upon contacting the trailer bottom will pivot about their horizontal axes so that they are in a plane parallel to a plane through the bottom of the trailer. The lift truck 12 then moves the rear end of the trailer 13 onto the flat car 10 and the four rear wheels at one side of the trailer are directed onto a turntable positioned adjacent the side of the flat car adjacent the platform 11 and pivotally mounted at its center to the floor of the flat car. The lift truck 12 then moves about the fifth wheel pin 52 from its position longitudinally of the trailer 13 to a position transversely of the trailer. During this movement the plates 27 rotate about the fifth wheel pin 52 and the structure will pivot about its horizontal axis to maintain the plates 27 in a plane parallel to a plane through the bottom of the trailer. The lift truck 12 then moves the front end of the trailer 13 onto the flat car with the four rear wheels above mentioned pivoting with the turntable and the four rear wheels at the other side of the trailer rolling on the floor of the flat car. When the front end of the trailer 12 is moved onto the flat car 10 the confronting surfaces on the wedge-shaped structures 5 on the lift truck 12 engage the adjacent pair of pins 9 on the fifth wheel stand 16 and the shoulders 8 of the lift truck are guided around the fifth wheel stand with the pins riding against and slightly spaced from the opposite walls of the opening 4 and when the angle 7 on the right hand side of Fig. 1 comes into contact with the channel 3 on the lift truck the fifth wheel pin 52 will be positioned directly over the opening in the channel 18. Movement of the lift truck 12 is stopped when the channel 3 on the lift truck comes into engagement with the angle 7 on the right hand side of Fig. 1. The elevator 21 on the lift truck 12 is then lowered so that the channel member 18 comes between the plates 27. The lift truck operator then moves the handle 46 until the elements 31 are moved away from each other into their recesses 30 in the plates 27. Lowering of the elevator 21 is continued until the fifth wheel pin 52 enters an opening in the web of the channel 18 and the bottom of the trailer 13 rests upon the channel. The elevator 21 on the lift truck 12 is then lowered further until the plates 27 are spaced from the bottom of the trailer 13. The lift truck 12 is then backed off the flat car 10 onto the platform 11. This completes the loading of the trailer 13 on the flat car 10.

To unload the trailer 13 from the flat car 10 the lift truck 12 is positioned transversely of the trailer 13 and then moves under the trailer and the shoulders 8 are guided around the pins 9 on the fifth wheel stand 16 and movement of the lift truck is stopped as the channel 3 on the lift truck comes into contact with the adjacent angle 7 on the stand. The elevator 21 on the lift truck 12 is raised until the plates 27 contact the bottom of the trailer 13 and upward movement of the elevator is continued so as to raise the bottom of the trailer off the channel 18. Upward movement of the elevator 21 is continued further until the arms 23 clear the stand 16. The lift truck operator moves the handle 46 to move the elements 31 toward each other so that the projections 33 and the pins 34 enclose the fifth wheel pin 52 on the trailer. The lift truck 12 then moves the front end of the trailer 13 off the flat car 10 onto the platform 11 with the four rear wheels at one side of the trailer pivoting with the turntable and the other four rear wheels at the other side of the trailer rolling on the floor of the flat car. The lift truck 12 then moves the trailer 13 off the flat car 10 onto the platform 11. The elevator 21 on the lift truck 12 is then lowered to lower the front end of the trailer 13 until it rests on its dolly wheels. The lift truck operator then moves the handle 46 to move the elements 31 away from each other into their recesses 30 in the plates 27. The elevator 21 on the lift truck 12 is lowered so that the plates 27 are spaced from the bottom of the trailer 13. The lift truck 12 is then backed from under the trailer 13 to complete the unloading of the trailer from the flat car 10.

From the foregoing it will be seen that there has been provided a lift truck for loading truck trailers on railway flat cars which has a mechanism that bears flatly against the bottom of the trailer regardless of the angle of inclination of the bottom of the trailer and quickly engages the fifth wheel pin of the trailer and has a central open area through which the fifth wheel stand on the flat car can pass when the mechanism is lowered and the trailer deposited on the stand and which is quickly movable off the flat car.

What is claimed is:

1. Apparatus for loading a truck trailer having a fifth wheel pin on a freight vehicle comprising a fifth wheel stand secured to the freight vehicle and provided with an opening in its top, guide pins secured to the stand, a lift truck including a body provided with an opening extending inwardly from one end and leaving shoulders forming the opposite walls of the opening, and wedge-shaped structures positioned at said one end of the body and secured to the shoulders, the lift truck being adapted to move the trailer onto the freight vehicle and the wedge-shaped structures on the shoulders being adapted to engage the pins on the stand to guide the shoulders around the stand and the end wall of the opening in the body being adapted to engage the stand to position the fifth wheel pin directly over the opening in the top of the stand.

2. Apparatus for loading a truck trailer having a fifth wheel pin on a freight vehicle comprising a fifth wheel stand secured to the freight vehicle and provided with an opening in its top, guide pins secured to the stand, an angle secured to the stand, a lift truck including a body provided with an opening extending inwardly from one end and leaving shoulders forming the opposite walls of the opening, wedge-shaped structures positioned at said one end of the body and secured to the shoulders, and a member positioned below the end wall of the opening and secured to the body, the lift truck being adapted to move the trailer onto the freight vehicle and the wedge-shaped structures on the shoulders being adapted to engage the pins on the stand to guide the shoulders on the body around the stand and the member being adapted to engage the angle on the stand to position the fifth wheel pin directly over the opening in the top of the stand.

References Cited in the file of this patent

UNITED STATES PATENTS

| | | |
|---|---|---|
| 1,668,530 | Romine | May 1, 1928 |
| 1,802,010 | Fitch | Apr. 21, 1931 |
| 1,875,052 | Ljungkull | Aug. 30, 1932 |
| 1,878,995 | Abbe | Sept. 27, 1932 |
| 1,935,006 | Athanassiou | Nov. 14, 1933 |
| 1,946,987 | Rogers | Feb. 13, 1934 |
| 2,077,484 | King | Apr. 20, 1937 |

(Other references on following page)

UNITED STATES PATENTS

| | | |
|---|---|---|
| 2,085,329 | Porte | June 29, 1937 |
| 2,240,723 | Stoehr | May 6, 1941 |
| 2,351,297 | Schwab | June 13, 1944 |
| 2,362,991 | Dahl | Nov. 21, 1944 |
| 2,541,209 | Cox | Feb. 13, 1951 |
| 2,596,477 | Frischmann et al. | May 13, 1952 |
| 2,628,107 | Schlairet | Feb. 10, 1953 |
| 2,637,453 | Cleveland | May 5, 1953 |
| 2,659,506 | Watkins | Nov. 17, 1953 |
| 2,683,546 | Sherriff | July 13, 1954 |
| 2,784,984 | Sherman | Mar. 12, 1957 |